United States Patent [19]
Pentegov et al.

[11] 3,895,211
[45] July 15, 1975

[54] ELECTROSTATIC WELDING APPARATUS

[76] Inventors: Igor Vladimirovich Pentegov, Zadorozhny pereulok, 6, kv. 14; Evgeny Petrovich Stemkovsky, ulitsa Brigadirskaya, 27, kv. 1; Sergei Nikolaevich Mescheryak, ulitsa Yanvarskogo Vosstania, 17a, kv. 6; Dmitry Alexeevich Sheikovsky, ulitsa Apri Barbjusa 5a, kv. 22; David Solomonovich Vorona, ulitsa Scherbakova, 51, kv. 21, all of Kiev, U.S.S.R.

[22] Filed: Dec. 20, 1973

[21] Appl. No.: 426,463

Related U.S. Application Data

[63] Continuation of Ser. No. 312,968, Dec. 7, 1972, abandoned, which is a continuation of Ser. No. 104,232, Jan. 6, 1971, abandoned.

[30] Foreign Application Priority Data

| Mar. 21, 1967 | U.S.S.R. | 1205113 |
| Mar. 14, 1968 | U.S.S.R. | 1225332 |
| May 27, 1970 | U.S.S.R. | 1434122 |

[52] U.S. Cl. ................................... 219/113; 320/1
[51] Int. Cl. ............................................. B23k 11/26
[58] Field of Search .......... 219/112, 113, 108, 114; 320/1; 307/109

[56] References Cited
FOREIGN PATENTS OR APPLICATIONS
204,458  12/1967  U.S.S.R. .............................. 219/113

*Primary Examiner*—Stuart N. Hecker
*Attorney, Agent, or Firm*—Holman & Stern

[57] ABSTRACT

An electrostatic welding apparatus is disclosed including a discharge circuit made in the form of a series network and including a battery of operating capacitors, a welding transformer, a controllable discharge switch connected to its control unit and to a power mains through a contactless switch, and a rectifier device having a descending outer characteristic. The said control unit comprises devices for setting a voltage level of said battery of operating capacitors including at least two voltage dividers which are connected in parallel to said battery of operating capacitors. In this case the controllable discharge switch is connected in parallel to the output of said rectifier, thereby providing for simultaneous discharge of the battery of operating capacitors through said welding transformer and disconnection of said battery from said rectifier.

3 Claims, 3 Drawing Figures

ELECTROSTATIC WELDING APPARATUS

This is a continuation, of application Ser. No. 312,968, filed Dec. 7, 1972 which in turn is a Continuation application of Ser. No. 104,232 filed 01/06/71, both now abandoned.

BACKGROUND OF THE INVENTION

The present invention relates to electric welding technique and, more particularly, the invention relates to apparatus for electrostatic spot welding.

The proposed apparatus can also be used in electric energy storage devices employing capacitors, i.e., in electronics, converting technique, electrohydraulics, etc.

Known in the art are electrostatic welding apparatuses including a rectifier for charging a bettery of operating capacitors, two switches, one being used for discharging the battery of operating capacitors and the other switch being used for connecting the battery to a source of a charging current; a control unit acting on the switch for discharging the above battery; shapers of control pulses acting on the control circuit of a controllable discharge switch and including pulse transformers, diodes, dinistors, and capacitors.

However, such known apparatuses feature significant disadvantages, consisting in that they do not provide for a required accuracy in stabilization of the supply voltage of a current source used for charging the battery of operating capacitors.

Furthermore, after the discharge of the battery of operating capacitors, the rectifier continues to act on the discharge circuit of the apparatus for a certain period of time. The contactless switch built around a dinistor must be protected from the interferences caused by the current flowing through the power circuit, and this presents difficulties in the process of adjustment of the apparatus and reduces the reliability of its operation.

SUMMARY OF THE INVENTION

An object of the present invention is to eliminate the above mentioned disadvantages.

The specific object of the invention is to provide an apparatus for electrostatic welding having a higher accuracy of stabilization of the voltage on the battery of operating capacitors, while enhancing the reliability of operation of the whole system.

This object is attained by providing an electrostatic welding apparatus having a discharge circuit including the following elements connected is series: a battery of operating capacitors, a welding transformer, a controllable discharge switch associated with its own control unit having a power pack, and a rectifier with a descending outer characteristic used for charging the battery of operating capacitors, wherein, according to the invention, the controllable discharge switch is connected in parallel to the output of the above-said rectifier, thereby providing for simultaneous discharge of the battery of operating capacitors through the said welding transformer and disconnection of the battery from the said rectifier.

The controllable discharge switch is preferably made as an electronic switch.

The control unit may be provided with at least two shapers of control pulses complete with setters of a voltage level of the battery of operating capacitors made in the form of voltage dividers whose inputs are connected in parallel to the battery of operating capacitors, the output of each divider is connected to the input of a respective shaper of control pulses, the output of the last shaper of control pulses being connected directly to the control electrode of the discharge switch while the output of each preceding shaper of control pulses being connected through a series circuit including a capacitor and rectifier, each terminal of which is connected to the cathode of the controllable discharge switch through a respective resistor.

The shaper of control pulses is preferably made in the form of a series circuit including a capacitor and two diodes oppositely connected through their cathodes, the junction of the diodes being connected to the dinistor anode and the junction between the capacitor and the diode being connected through a resistor to the positive terminal of the power source, in which case the free end of the capacitor is connected to the negative terminal of the same source.

The proposed apparatus can be most effectively used for precision contact microwelding of components of electronic and semiconductor technique which have to meet high technological requirements (metal flashes are inadmissible, while the welded members must have a high mechanical strength and stability in operation).

The apparatus is not sensitive to voltage fluctuations of the power mains within ±20 percent, the circuit of the system is very simple, economical, and provides for a high efficiency.

BRIEF DESCRIPTION OF THE DRAWINGS

The invention is further described by way of example with reference to the accompanying drawings, in which.

DETAILED DESCRIPTION OF A PREFERRED EMBODIMENT

The proposed apparatus makes it possible to effect a welding operation by any number of the welding current pulses, however the description of the invention is limited by the operation of the apparatus by a two-pulse cycle.

Figure 1:
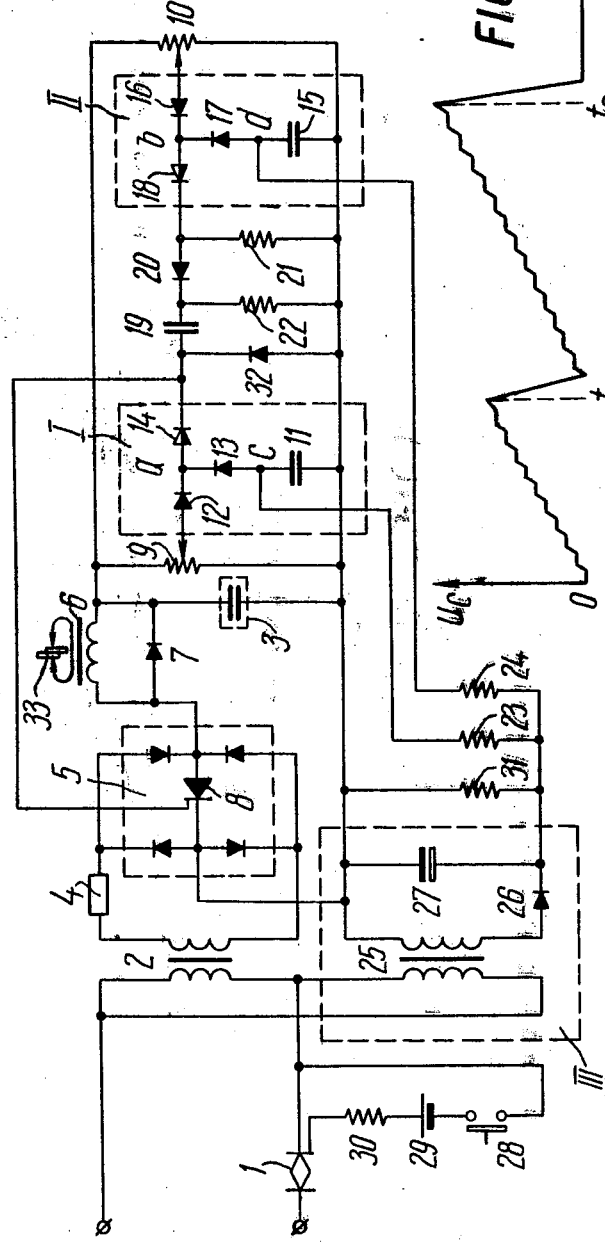
FIG. 1 shows an electric circuit diagram of the electrostatic welding apparatus.

The electrostatic welding apparatus comprises: a contactless switch 1, for example a bidirectional triode thyristor (triac), inserted into the circuit of the primary winding of the transformer 2 and used for charging the battery of operating capacitors (FIG. 1 conventionally shows only one capacitor The secondary winding of the transformer 2 through a current limiter 4 is connected to a rectifier 5 built around a Gratz circuit. The connection of the current limiter 4 in series with the charging circuit provides for a descending outer characteristic of the rectifier 5. The above-said current limiter consists of either a capacitor or an inductance, in which case the efficiency factor of the charging circuit is close to 1.

The discharge circuit of the apparatus comprises the following components connected in series: a welding transformer 6 whose primary winding is bridged by a diode 7, a battery 3 of operating capacitors, and a controllable discharge switch 8 (for example a thyristor) connected in parallel to the output of the rectifier 5.

The unit for controlling the discharge switch 8 includes setters of a voltage level of the battery 3 of operating capacitors made in the form of resistor voltage dividers 9 and 10, and shapers I and II of control pulses which may comprise, for example, trigger circuits, the input of each shaper being connected to the output of a corresponding voltage divider (9 or 10). The shaper I of control pulses whose input is connected to the output of the divider 9 is a series circuit including a capacitor 11 and two oppositely poled diodes 12 and 13 whose junction a is connected to the anode of a dinistor 14 whose anode is an output of the above-said control pulses shaper I and is connected to the control electrode of the controllable discharge switch 8. The shaper II of control pulses whose input is connected to the output of the divider 10 is made in the form of a series connected capacitors 15 and two oppositely poled diodes 16 and 17 whose junction point of cathode connection b is connected to the anode of the dinistor 18. The cathode of the dinistor 18 is connected to the control electrode of the discharge switch 8 through a series circuit including a capacitor 19 and a diode 20 whose anode and cathode through respective resistors 21 and 22 are connected to the cathode of the controllable discharge switch 8. The common point or junction c of the capacitor 11 and diode 13 as well as the junction d of the capacitor 15 and diode 17 through respective resistors 23 and 24 are connected to the positive terminal of the power source III consisting of a transformer 25, diode 26 and a capacitor 27, the negative terminal of the power source III being connected to the "minus" point of the rectifier 5. This source III is connected to the power mains through a noncontact switch 1.

The apparatus also comprises a starting button 28, a source 29 of electromotive force used for starting the noncontact switch 1, a limiting resistor 30, a leakage resistor 31, a diode 32 to protect the control circuit of the controllable discharge switch 8 from back voltages.

The proposed apparatus operates as follows:

In the initial position the noncontact switch 1 is off and the battery 3 of operating capacitors is not charged. The controllable discharge switch 8, the dinistors 14 and 18 are switched off, while the capacitor 27 is discharged through the leakage resistor 31. In this case the dividers 9 and 10 of the voltage level on the battery 3 of operating capacitors are selected so that the voltage divider 9 allows the battery 3 of operating capacitors to be charged to a higher level than the divider 10.

By pressing the starting button 28, the noncontact switch 1 is triggered as a current from the source 29 of electromotive force starts to flow through the controllable electrode of the switch 1. In this case the mains voltage is applied to the transformers 2 and 25, thereby initiating a smooth charge of the battery 3 of operating capacitors from the rectifier 5 through the current limiter 4 (the time period $0 - t_1$ in FIG. 2a.

At the same time, owing to the connection of the transformer 25 to the power mains, a direct voltage appears on the plates of the capacitor 27 which through the resistors 23 and 24 respectively charges the capacitors 11 and 15 to a voltage level which is lower than the switching voltage of the dinistors 14 and 18.

It should be noted that the dinistors 14 and 18 are switched on when the voltage at the output of the dividers 9 and 10 strictly proportional to the voltage on the battery 3 of operating capacitors becomes equal to the switching voltage of the dinistor 14 and 15 respectively.

The proportionality factor is determined by the position of the sliders of the dividers 9 and 10 and its value is constant as the switching current of the dinistors 14 and 18 is extremely low and cannot change the coefficient of division of the dividers 9 and 10, while the integrating effect of the capacitors 11 and 15 is eliminated by suitable connection of the diodes 13 and 17.

Thus, a high accuracy of stabilization of the voltage on the battery 3 of operating capacitors is ensured. Upon obtaining a predetermined voltage set by means of the divider 10 (at the time moment $t_1$, FIG. 2a), the dinistor 18 is switched on. In this case the capacitor 15 is discharged through the circuit: diode 17, dinistor 18, rectifier 20, capacitor 19, and then through the section of the circuit connecting the capacitor 19 with the control electrode of the discharge switch 8. This control pulse is intensified at the expense of the discharge current of the capacitor 27 through the resistor 24 and its duration is determined by the time of charging the capacitor 19 whose capacitance is selected so as to provide a pulse duration required for triggering the controllable discharge switch 8.

When the control pulse passes through the control electrode of the discharge switch 8, the latter is switched on and the battery 3 of operating capacitors is discharged through the welding transformer 6. This first pulse of the welding current (FIG. 2b) only shapes the contact surfaces of the members 33 pressed between the electrodes. After passing the first shaping pulse of the welding current, the dinistor 18 remains in a conductive state due to the current flowing from the power source III through the circuit: positive terminal of power source III, capacitor 27, resistor 24, diode 17, dinistor 18, resistor 21, negative terminal terminal of power source III, whereas the controllable discharge switch 8 is off as its control circuit is deenergized (the isolating capacitor 19 is charged).

Figure 2A:
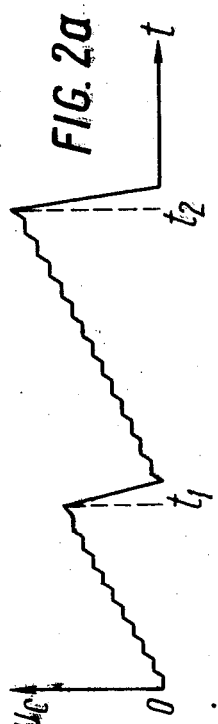
FIG. 2a shows a voltage diagram of the battery of operating capacitors.
Figure 2B:
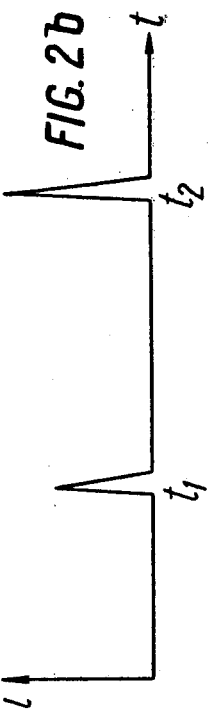
FIG. 2b shows a welding current diagram.

After rendering the controllable discharge switch 8 nonconductive, the battery 3 of operating capacitors starts to be charged again. This corresponds to the section $O-t_2$ on the diagram (FIG. 2a). Upon obtaining a higher voltage level predetermined by the divider 9, the dinistor 14 is switched on at the time moment $t_2$ (FIG. 2b). In this case the discharge current of the capacitor 11 flows through the control electrode-cathode path of the controllable discharge switch 8. The controllable discharge switch 8 is switched on again and the battery 3 of operating capacitors is again discharged through the welding transformer 6, thereby welding the workpieces 33. In this case the controllable discharge switch 8 remains conductive (a current flows through its control circuit from the positive terminal of the power source III to the negative terminal of the same through the resistor 23, diode 13 and dinistor 14) bridging the battery 3 of operating capacitors and preventing it from being charged by the rectifier 5.

A rectified current limited by the current limiter 4 flows through the energized controllable switch 8. The contactless switch 1, as well as the dinistors 14 and 18, also remain conductive until the starting button 28 is released.

After releasing the button 28 the contactless switch 1 is switched off, the transformer 25 is deenergized, thereafter, the controllable discharge switch 8 and dinistors 14 and 18 are cut off. The capacitor 19 is discharged through the diode 32 and resistor 22, while the capacitor 27 is discharged through the resistor 31.

After that the apparatus is ready for a new welding cycle. When the button 28 is depressed once again, the two-pulse cycle is repeated. The apparatus can also operate under single pulse operating conditions, for which purpose it is sufficient to disconnect the voltage divider 10 from the battery 3 of operating capacitors.

The proposed apparatus operates as a relaxation generator with a discretely variable level of relaxation without disconnection of the rectifier from the power mains during the welding cycle. The apparatus provides for smooth control and precision stabilization of the voltage on the capacitors. The apparatus is designed for a combined welding cycle with optimum heating characteristics. The first pulse of the welding current at a two-pulse cycle eliminates the scatter of the initial contact resistances, thus providing for the similar temperature conditions during the process of welding. Therefore, the two-pulse welding conditions provided by the proposed apparatus increases the stability and high quality of weld joints and eliminates the possibility of appearance of flashes of metal from the welding zone. The independent control of the first (shaping) and the second (welding) current pulses contribute largely to the above-said welding conditions.

The proposed apparatus features the following advantage as compared with the known capacitor welding devices:

-it effects precision parametric stabilization of the charge voltage of the battery of operating capacitors providing for storing a strictly definite amount of energy, thus increasing the quality of the welding;

-it allows one to effect an optimal two-pulse welding cycle with a time interval between the shaping and welding current pulses adequate for complete cooling of the members being welded;

-it features higher operational characteristics as compared to the known devices, while the circuit of the proposed apparatus is extremely simple and highly reliable in operation.

We claim:

1. An electrostatic welding apparatus comprising a transformer, a triac, a current limiter and a rectifier; the primary winding of said transformer connected through the triac to an A.C. mains, and the secondary winding of said transformer connected through said current limiter to said rectifier; a controllable discharge switch having a control electrode, a welding transformer, a battery of capacitors and a diode; the anode of said discharge switch connected to the positive terminal of said rectifier and to the anode of said diode and to one of the outputs of the primary winding of the welding transformer, the secondary winding of said welding transformer connected to the workpieces being welded, the cathode of said controllable discharge switch connected to the negative terminal of said rectifier and to one of the outputs of said battery of capacitors, the other output thereof connected to the cathode of said diode and to the other end of the primary winding of the welding transformer; a control unit and a supply source, the control electrode of said controllable discharge switch connected to the output of the control unit which includes at least two trigger circuits comprising dinistor means for stepwise increasing the voltage in the battery of capactiors.

2. The apparatus as claimed in claim 1, wherein each of said at least two trigger circuits include means for setting a voltage level of said battery of capacitors which means comprise resistor voltage dividers, the inputs of said voltage dividers connected in parallel to said battery of capacitors, while the output of each of said voltage dividers is connected to a respective input of said trigger circuit, the output of one trigger circuit connected directly to the control electrode of the controllable discharge switch, and the output of each remaining trigger circuit fed through a series-connected capacitor and diode to the cathode of said controllable discharge switch through a respective resistor.

3. The apparatus as claimed in claim 2 wherein said trigger circuit comprises a series-connected capacitor and two diodes oppositely poled through their cathodes, the junction point of said capacitor and the diode connected thereto connected through a resistor to the positive terminal of said supply source of the control unit, the other output of the capacitor connected to the negative terminal of said source.

* * * * *